(12) United States Patent
Oriji et al.

(10) Patent No.: US 10,422,021 B2
(45) Date of Patent: Sep. 24, 2019

(54) METHOD FOR PRODUCING VANADIUM COMPOUND, METHOD FOR PRODUCING VANADIUM SOLUTION, AND METHOD FOR PRODUCING REDOX FLOW BATTERY ELECTROLYTE

(71) Applicant: SHOWA DENKO K.K., Tokyo (JP)

(72) Inventors: Gaku Oriji, Chiba (JP); Kenzo Hanawa, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/863,193

(22) Filed: Jan. 5, 2018

(65) Prior Publication Data

US 2018/0135149 A1    May 17, 2018

Related U.S. Application Data

(63) Continuation-in-part of application No. PCT/JP2016/072938, filed on Aug. 4, 2016.

(30) Foreign Application Priority Data

Jun. 3, 2016 (JP) .................................. 2016-112026

(51) Int. Cl.
*H01M 8/04* (2016.01)
*C22B 59/00* (2006.01)
(Continued)

(52) U.S. Cl.
CPC ............. *C22B 34/22* (2013.01); *C01G 31/00* (2013.01); *C01G 31/02* (2013.01); *C22B 3/44* (2013.01);
(Continued)

(58) Field of Classification Search
CPC ...................................................... H01M 8/04
See application file for complete search history.

(56) References Cited

U.S. PATENT DOCUMENTS 4,814,150 A    3/1989 Corigliano et al.
4,966,761 A *  10/1990 Lakshmanan ........... C01B 39/02
                                                    423/112
(Continued)

FOREIGN PATENT DOCUMENTS

CN         1631797 A     6/2005
CN       101215005 A     7/2008
(Continued)

OTHER PUBLICATIONS

Keiichi Miura et al., "Recovery of Vanadium from oil Burning Ash", Inorganic materials, May 1999, pp. 213-219, vol. 6.
(Continued)

*Primary Examiner* — Jacob B Marks
(74) *Attorney, Agent, or Firm* — Sughrue Mion, PLLC

(57) ABSTRACT

This method for producing a vanadium compound has an alkaline leaching step for immersing incineration ash in an alkaline solution to cause vanadium to leach from the incineration ash into the alkaline solution and obtain a leachate slurry, a solid-liquid separation step for separating the leachate slurry obtained in the alkaline leaching step into a solid and liquid followed by removing insoluble matter to obtain a leachate, a pH adjustment step for adding acid to the leachate following solid-liquid separation to make the leachate acidic, an aging step for aging the leachate following pH adjustment until a precipitate forms in the leachate, and a separation step for separating the precipitate from the leachate following the aging step.

17 Claims, 2 Drawing Sheets

(51) Int. Cl.
*C22B 34/22* (2006.01)
*C01G 31/00* (2006.01)
*C22B 3/44* (2006.01)
*C22B 7/02* (2006.01)
*C01G 31/02* (2006.01)
*C22B 7/00* (2006.01)
*H01M 8/18* (2006.01)

(52) U.S. Cl.
CPC ............... *C22B 7/008* (2013.01); *C22B 7/02* (2013.01); *H01M 8/188* (2013.01); *H01M 2300/0005* (2013.01); *Y02P 10/234* (2015.11)

(56) References Cited

U.S. PATENT DOCUMENTS

| | | | | |
|---|---|---|---|---|
| 2002/0112968 | A1* | 8/2002 | Shiroto | C01G 31/00 205/496 |
| 2011/0214535 | A1* | 9/2011 | Vandor | B01D 53/1475 75/392 |
| 2013/0091989 | A1* | 4/2013 | Sun | C22B 7/007 75/739 |

FOREIGN PATENT DOCUMENTS

| | | |
|---|---|---|
| CN | 101412540 A | 4/2009 |
| JP | 53-40610 A | 4/1978 |
| JP | 62-298489 A | 12/1987 |
| JP | 63-095118 A | 4/1988 |
| JP | 8-176689 A | 7/1996 |
| JP | 2000-247645 A | 9/2000 |
| JP | 2001-287913 A | 10/2001 |
| JP | 2002-193620 A | 7/2002 |
| JP | 2002-256354 A | 9/2002 |

OTHER PUBLICATIONS

Takeno, N., "Eh-pH Diagram Atlas", May 2005, Geological Survey of Japan, Collection of Research Data, No. 419 (online), National Institute of Advanced Industrial Science and Technology (search date: May 30, 2016), Internet address: https://www.gsj.jp/data/openfile/no0419/ openfile419j.pdf.

Jacques Livage, "Hydrothermal Synthesis of Nanostructured Vanadium Oxides", Materials 2010, pp. 4175-4195, vol. 3.

International Search Report of PCT/JP2016/072938 dated Sep. 6, 2016 [PCT/ISA/210].

Communication dated Jan. 12, 2018 from the Taiwanese Intellectual Property Office in counterpart application No. 106114121.

Communication dated Apr. 23, 2019, from the Japanese Patent Office in counterpart Application No. 2017-539703.

* cited by examiner

METHOD FOR PRODUCING VANADIUM COMPOUND, METHOD FOR PRODUCING VANADIUM SOLUTION, AND METHOD FOR PRODUCING REDOX FLOW BATTERY ELECTROLYTE

This application is a CIP of PCT/JP2016/072938 filed Aug. 4, 2016, which claims priority from Japanese Patent Application No. 2016-112026, filed in Japan on Jun. 3, 2016, the above-noted applications incorporated herein by reference in their entirety.

TECHNICAL FIELD

The present invention relates to a method for producing a vanadium compound, a method for producing a vanadium solution and a method for producing a redox flow battery electrolyte.

BACKGROUND ART

Vanadium is used in various applications. The main application thereof at present is its addition to steel. The addition of vanadium to steel in the form of ferrovanadium improves the mechanical properties and heat resistance of steel. Vanadium is also used as a catalyst and as an electrolyte of redox flow batteries.

Vanadium is obtained in the form of vanadium pentoxide ($V_2O_5$) by roasting and extraction of vanadium slag. However, vanadium pentoxide obtained by this method is expensive. Consequently, the use of vanadium pentoxide in the electrolyte of redox flow batteries and the like leads to higher prices for redox flow batteries.

Attention has recently been focused on vanadium contained in incineration ash generated following combustion of fuel in boilers such as those used at power plants. Incineration ash ends up becoming industrial waste depending on the ash and components contained therein. It if were possible to recover vanadium from this incineration ash, it would enable vanadium compounds to be acquired at low cost.

For example, Non-Patent Document 1 describes that a sulfuric acid solution is superior to an aqueous ammonia solution as a solvent for leaching vanadium ions from burning ash. In addition, Patent Document 1 describes a method for obtaining a trivalent vanadium salt by reacting inorganic acid with a trivalent vanadium compound obtained by calcination of precipitator ash. In addition, Patent Document 2, for example, describes a method for obtaining vanadium compounds by leaching vanadium ions from Orimulsion ash in a solvent at pH 3 or lower and solvent extraction.

PRIOR ART DOCUMENTS

Patent Documents

[Patent Document 1] Japanese Unexamined Patent Application, First Publication No. 2000-247645
[Patent Document 2] Japanese Unexamined Patent Application, First Publication No. 2001-287913

Non-Patent Documents

[Non-Patent Document 1] Inorganic Materials, Vol. 6, May, 213-219 (1999)
[Non-Patent Document 2] Takeno, N., "Eh-pH Diagram Atlas", May 2005, GSJ Open-File Report, No. 419 (online), National Institute of Advanced Industrial Science and Technology (search date: May 30, 2016), Internet address: https://www.gsj.jp/data/openfile/no0419/openfile419j.pdf)
[Non-Patent Document 3] Materials, 3, 4175-4195 (2010)

DISCLOSURE OF THE INVENTION

Problems to be Solved by the Invention

However, when incineration ash is added to a strongly acidic solution that has a pH of 3 or lower, iron contained in the incineration ash leaches out into the solution in the form of ions together with vanadium, thereby resulting in iron element being contained in the resulting vanadium compound. For example, if an electrolyte containing iron element is used as an electrolyte of a redox flow battery, there is the potential for the iron to precipitate. Precipitated iron in the electrolyte causes the generation of hydrogen. Hydrogen generation can cause a decrease in battery capacity.

With the foregoing in view, an object of the present invention is to provide a novel method for producing a vanadium compound that is capable of reducing iron element content.

Means for Solving the Problems

The inventors of the present invention found that, by immersing incineration ash in an alkaline solution and removing undissolved insoluble matter by filtering followed by making the solvent acidic, a vanadium compound can be obtained that has a low iron element content.

Namely, the present invention is provided with the configurations indicated below.

(1) A method for producing a vanadium compound according to one aspect of the present invention has: an alkaline leaching step for immersing incineration ash in an alkaline solution to cause vanadium to leach from the incineration ash into the alkaline solution and obtain a leachate slurry, a solid-liquid separation step for separating the leachate slurry obtained in the alkaline leaching step into a solid and liquid followed by removing insoluble matter to obtain a leachate, a pH adjustment step for adding acid to the leachate following solid-liquid separation to make the leachate acidic, an aging step for aging the leachate following pH adjustment until a precipitate forms in the leachate, and a separation step for separating the precipitate from the leachate following the aging step.

(2) The method for producing a vanadium compound described in (1) above, wherein the solid-liquid separation may be carried out by filtration.

(3) The method for producing a vanadium compound described in (1) or (2) above, wherein an oxidizing agent may be added to the alkaline solution in the alkaline leaching step.

(4) The method for producing a vanadium compound described in any of (1) to (3) above, wherein the pH of the alkaline solution following immersion of the incineration ash in the alkaline leaching step may be 10 or higher.

(5) The method for producing a vanadium compound described in any of (1) to (4) above, wherein the method may additionally have an impurity removal step for filtering the leachate when the pH of the leachate has been made higher than 6 but lower than 8 by addition of acid in the pH adjustment step.

(6) The method for producing a vanadium compound described in any of (1) to (5) above, wherein the temperature in the aging step may be 20° C. to 200° C.

(7) The method for producing a vanadium compound described in any of (1) to (6) above, wherein the duration of aging of the leachate in the aging step may be 2 hours to 3000 hours.

(8) The method for producing a vanadium compound described in any of (1) to (7) above, wherein the vanadium compound produced may include at least one compound selected from the group consisting of $NaV_3O_8 \cdot 1.5H_2O$, $H_{0.33}Na_{0.67}V_3O_8 \cdot 1.5H_2O$, $H_{0.2}V_{0.8}V_3O_8 \cdot H_2O$, $KV_3O_8 \cdot 1.5H_2O$, $H_{0.3}K_{0.7}V_3O_8 \cdot 1.5H_2O$ and $H_{0.4}K_{0.6}V_3O_8 \cdot 2H_2O$.

(9) The method for producing a vanadium compound described in any of (1) to (8) above, wherein the amount of Fe contained in the vanadium compound produced may be less than 0.1% by mass.

(10) A method for producing a vanadium solution according to a first aspect of the present invention has a dissolution step for dissolving a vanadium compound, obtained with the method for producing a vanadium compound described in any of (1) to (9) above, in sulfuric acid.

(11) The method for producing a vanadium solution described in any (10) above, wherein sulfurous acid gas and aqueous sulfurous acid solution may be added to the sulfuric acid in the dissolution step.

(12) A method for producing a redox flow battery according to a first aspect of the present invention is a method for producing a redox flow battery electrolyte using a vanadium compound produced according to the method for producing a vanadium compound described in any of (1) to (9) above, wherein the electrolyte contains at least one of trivalent and tetravalent vanadium ions.

(13) The method for producing a redox flow battery described in (12) above, wherein the iron concentration in the electrolyte may be 100 ppm by mass or less and the nickel concentration may be 200 ppm by mass or less.

Effects of the Invention

According to the method for producing a vanadium compound according to one aspect of the present invention, a vanadium compound can be obtained that has low iron element content.

BEST MODE FOR CARRYING OUT THE INVENTION

Figure 1:
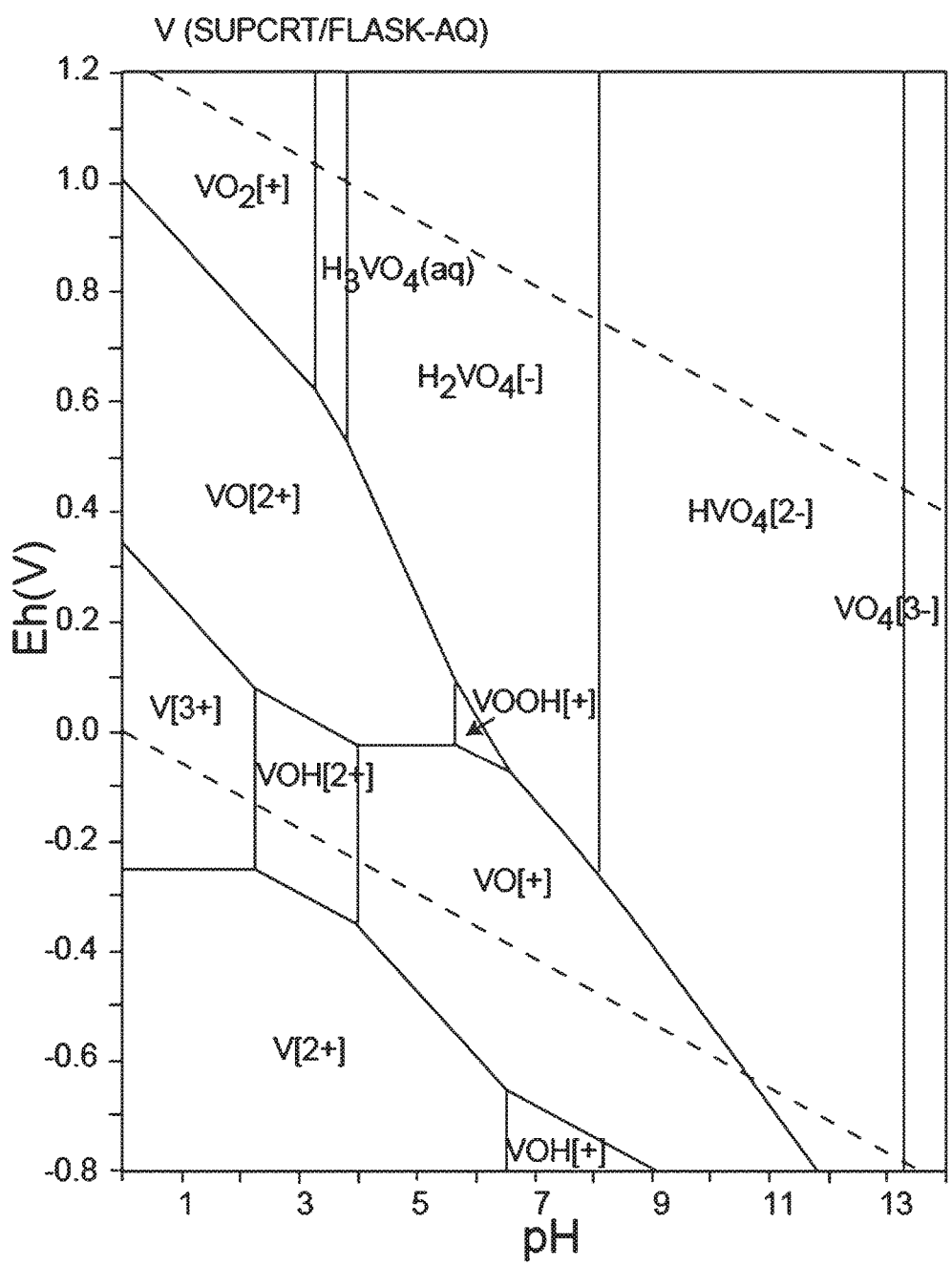
FIG. 1 is a potential-pH diagram of a vanadium aqueous system (source: Non-Patent Document 2).

The following provides an explanation of the configuration of an embodiment of the present invention. The present invention can be suitably modified within a range that does not alter the gist thereof.

(Method for Producing a Vanadium Compound)

The method for producing a vanadium compound according to one aspect of the present invention has an alkaline leaching step, a filtration step, a pH adjustment step, an aging step and a separation step. The following provides a detailed explanation of each step.

[Alkaline Leaching Step]

In the alkaline leaching step, incineration ash is immersed in an alkaline solution. Vanadium ions leach into the alkaline solution as a result of immersing the incineration ash in the alkaline solution.

First, incineration ash and an alkaline solution are prepared. In the present description, an "alkaline solution" refers to a solution having a pH of 8 or higher. The pH region of higher than 6 but lower than 8 is defined as neutral, while the pH region of lower than 6 is defined as acidic. Furthermore, pH in the present invention refers to the pH at the temperature at which each step is carried out, and is the pH value at room temperature when temperature is not specifically indicated.

There are no particular limitations on the material that composes the alkaline solution. For example, sodium hydroxide, sodium carbonate or potassium hydroxide can be used. The concentration of these bases is only required to be the concentration at which the pH ranges to be subsequently described are obtained, and for example, is preferably 0.007 mol/L to 16 mol/L and more preferably 0.007 mol/L to 5 mol/L.

The incineration ash refers to combustion residue generated during combustion of fuel in a boiler at a thermal power plant and the like. Combustion residue is broadly divided into fly ash and furnace ash. Fly ash frequently accumulates in electrostatic precipitators and is also referred to as EP ash. Fossil fuels commonly used as fuel contain vanadium. Consequently, vanadium is also contained in fly ash and furnace ash following combustion. Both fly ash and furnace ash are contained in incineration ash.

Fly ash contains 60% by mass to 95% by mass of unburned carbon, 0% by mass to 20% by mass of ammonium sulfate, and other metals. These other metals consist of 0% by mass to 5% by mass of aluminum, 0% by mass to 1% by mass of barium, 0% by mass to 5% by mass of calcium, 0% by mass to 0.5% by mass of cobalt, 0% by mass to 3% by mass of chromium, 0% by mass to 20% by mass of iron, 0% by mass to 3% by mass of magnesium, 0% by mass to 1% by mass of manganese, 0% by mass to 3% by mass of sodium, 0% by mass to 20% by mass of nickel, 0% by mass to 3% by mass of titanium, 0.01% by mass to 30% by mass of vanadium, 0% by mass to 20% by mass of silicon, and 0% by mass to 0.1% by mass of other trace metals. These ratios vary according to the temperature inside the furnace during combustion of fuel and differences in the substances loaded into the furnace. Furnace ash differs from fly ash in that it does not contain unburned carbon.

The incineration ash is immersed in the prepared alkaline solution. A leachate is obtained as a result of vanadium ions leaching from the incineration ash. The alkaline solution slurry following addition of incineration ash is hereinafter referred to as "leachate slurry", and its solution component is referred to as "leachate".

The alkaline solution preferably has a pH of 10 or higher prior to adding to the incineration ash.

The pH of the leachate following addition of incineration ash is preferably 5 or higher and more preferably 10 or higher. Incineration ash generally exhibits acidity in a solvent. Consequently, the leachate may exhibit acidity provided the pH is not strongly acidic at 1 to 3.

If incineration ash is immersed in a strongly acidic solvent having a pH of 3 or lower, iron ions are leached from the incineration ash together with vanadium ions. For example, if an electrolyte containing iron element is used as an electrolyte of a redox flow battery, there is the potential for precipitation of iron.

Although impurities such as Fe or Ni are not very problematic when considering using as additives to steel materials, in the case of using in a redox flow battery, it is necessary to remove heavy metals other than vanadium. This is because, in an electrolyte, precipitated iron or nickel can cause the generation of hydrogen, and this hydrogen generation can cause a decrease in battery capacity.

In contrast, when incineration ash is added to an alkaline solution, the leachate is not expected to exhibit strong acidity. Consequently, the precipitation of iron contained in incineration ash in the leachate is avoided.

In addition, according to the potential-pH diagram shown in FIG. 1 (ion concentration, temperature and pressure are $\Sigma V=10^{-10}$ mol/kg, 298.15 K and $10^5$ Pa, respectively), vanadium is mainly present in a pentavalent state if pH is within the stable range of water at pH 6 to 14. Although pentavalent vanadium easily leaches into solution within this range, tetravalent or trivalent vanadium has difficulty in leaching into solution. The amount of vanadium that leaches into the leachate can be increased as a result of pentavalent vanadium being in a stable state.

In addition, leaching of nickel into the leachate can also be inhibited if the pH of the leachate is 10 or higher.

Nickel also leaches into neutral solvents. Leaching of nickel into the alkaline solution can be inhibited by making the pH of the leachate to be 10 or higher. The pH of the alkaline solution prior to immersing the incineration ash therein is preferably 12.5 or higher.

In addition, leaching of other impurities in the form of calcium or magnesium into the leachate is also preferably inhibited. The pH of the leachate is preferably 13 or higher from the viewpoint of inhibiting leaching of calcium and magnesium into the leachate. In addition, the pH prior to immersing the incineration ash is preferably 13 or higher.

On the other hand, if the alkalinity of the leachate is excessively strong, impurities such as aluminum or silicon may leach into the leachate. In addition, if the alkalinity of the leachate is excessively strong, the leached amount of iron ions ends up increasing. Consequently, the hydroxide ion concentration of the alkaline solution prior to immersion of incineration ash is preferably 16 mol/L or less. In addition, if the hydroxide ion concentration is excessively high, liquid viscosity increases resulting in greater difficulty during filtration to be subsequently described. From this viewpoint, the hydroxide ion concentration of the alkaline solution prior to immersion of incineration ash is preferably 5 mol/L or less.

In addition, an oxidizing agent is preferably added to the alkaline solution in the alkaline leaching step. An oxidizing agent may also be added to the leachate slurry after adding the incineration ash.

Vanadium contained in incineration ash consists of not only pentavalent vanadium, but also includes tetravalent and trivalent vanadium. As was previously described, although pentavalent vanadium easily leaches into solution, tetravalent or trivalent vanadium has difficulty leaching into solution. The amount of vanadium ions that leach into the leachate can be increased by using an oxidizing agent to oxidize tetravalent or trivalent vanadium into the pentavalent state.

Examples of oxidizing agents that can be used preferably include hypohalous acids and salts thereof, halous acids and salts thereof, halogen acids and salts thereof, perhalogen acids and salts thereof, permanganic acid and salts thereof, chromic acid and salts thereof, and hydrogen peroxide.

Furthermore, although the previous explanation has used the example of adding incineration ash to an alkaline solution, an alkaline substance such as a hydroxide may be added to water having incineration ash immersed therein followed by stirring.

[Filtration Step]

Although the following provides an explanation of the present step using filtration as a typical example of solid-liquid separation (and the present step is therefore referred to as the "filtration step"), another solid-liquid separation method such as centrifugation can also be used instead of filtration. In the filtration step, the leachate slurry obtained in the alkaline leaching step is subjected to filtration. As a result of filtering the leachate slurry, the slurry can be separated into leachate, into which vanadium ions have leached, and incineration ash containing insoluble matter such as iron. Separation into leachate and incineration ash prevents iron and other impurities from entering subsequent steps.

There are no particular limitations on the filter cloth or filter paper used for filtration. Examples thereof that can be used include membrane filters having a pore size of the submicron order or several micrometers, filter paper, filter cloth and thickeners widely used in industrial applications.

[pH Adjustment Step]

In the pH adjustment step, acid is added to the leachate following filtration to acidify the leachate.

There are no particular limitations on the acid used. Examples of acids that can be used include inorganic acids such as hydrochloric acid, sulfuric acid or phosphoric acid, and organic acids such as higher carboxylic acids or phenol.

Figure 2:
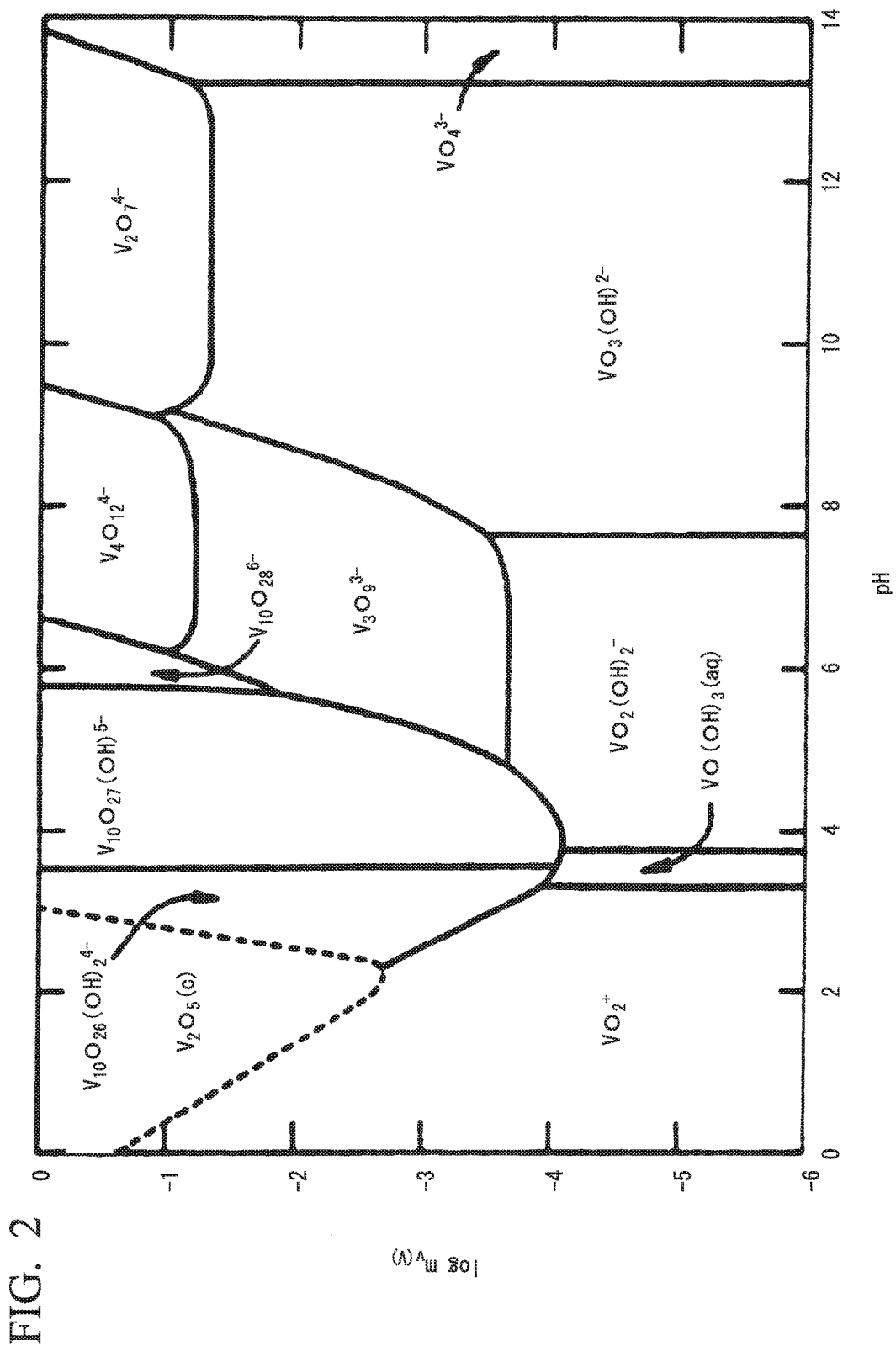
FIG. 2 is a phase diagram indicating the relationship between pH and solubility of tetravalent vanadium ions (source: Non-Patent Document 3).

FIG. 2 is a phase diagram indicating the relationship between pH and solubility of pentavalent vanadium ions. The $V_2O_5$ region shown in FIG. 2 indicates the solid region, and solid precipitates in the $V_2O_5$ region. Namely, vanadium compounds precipitate as a result of making the pH of the solution to be lower than 4.

The pH following pH adjustment is preferably 1.3 to 2.9. According to the phase diagram, although the region in which pH is within the range of 0 to less than 4 has a $V_2O_5$ region in which solids precipitate, when the pH following pH adjustment is made to be within the aforementioned range, vanadium compounds precipitate easily.

In addition, precipitates may form as the pH is lowered by addition of acid in the pH adjustment step. These precipitates are oxides or hydroxides of aluminum or silicon, and are impurities that precipitate at a pH of about 6 to 7. For example, if aluminum or silica is contained in the electrolyte of a redox flow battery, the filter cloth used in the filtration or washing step becomes clogged during the course thereof, thereby resulting in increased susceptibility to the occurrence of problems such as a decrease in active surface area of the electrodes. Consequently, precipitates that form during the course of the pH adjustment are required to be separated from the solution as much as possible. Therefore, it is preferable to further provide an impurity removal step for removing impurities from the leachate when the pH becomes neutral due to the addition of acid in the pH adjustment step. The impurity removal step is not limited to being carried out once, but rather may be carried out multiple times. Removal of impurities can be carried out by filtration, for example.

[Aging Step]

In the aging step, the leachate is allowed to stand under fixed conditions following pH adjustment until a precipitate forms therein. According to the phase diagram, solids precipitate in the $V_2O_5$ region. However, this does not mean that a precipitate will actually form immediately just because the leachate has satisfied the conditions of the $V_2O_5$ region.

Pentavalent vanadium ions are thought to exist in a supersaturated state in the form of vanadic ions ($VO_2^+$) and decavanadate ions ($V_{10}O_{26}(OH)_2^{4-}$) at the stage the pH reaches 1.3 to 2.9. As time passes, dehydration condensation polymerization occurs from hydrated ions and the like and this is understood to give rise to the framework of pentavalent vanadium oxide and the formation of crystals.

In the aging step, the leachate following pH adjustment is held for a prescribed amount of time under prescribed temperature conditions.

The pH of the leachate following pH adjustment is equivalent to the pH immediately after pH adjustment, and is preferably 1.3 to 2.9.

In addition, the temperature in the aging step is preferably 20° C. to 200° C. and more preferably 20° C. to lower than 100° C. If the temperature is excessively low, the amount of time required for precipitation becomes longer. On the other hand, if the temperature is excessively high, precipitation occurs rapidly.

Vanadium ions can be made to precipitate at temperatures of 200° C. or lower since the solubility of vanadium is sufficiently low. In addition, it is important that the vanadium ions precipitate as particles of a size that facilitates filtration, and filtration and washing end up becoming difficult if the vanadium ions are allowed to precipitate as microparticles or in a gelatinous state. In addition, equipment such as pressurization equipment is required at temperatures of 100° C. or higher since moisture in the leachate evaporates. Although pressurization equipment results in increased costs, vanadium ions may be precipitated at 100° C. or higher provided it is possible to precipitate in the form of particles having a size that facilitates washing.

Moreover, aging may be continued while lowering the aging temperature after having aged for a fixed period of time at a high temperature. As a result, vanadium compounds precipitate more rapidly and the precipitated amount thereof can be increased.

The duration of aging is preferably 2 hours to 3000 hours. An adequate amount of vanadium compound can be obtained if the aging time is 3000 hours even in normal temperature environments. On the other hand, the duration of aging is preferably as short as possible in order to enhance production efficiency.

Carrying out the aging step makes it possible to remove ions such as calcium ions ($Ca^{2+}$), ammonium ions ($NH_4^+$), silicate ions or aluminate ions, as well as other trace elements contained in the liquid, by filtration and washing. These ions are thought to have difficulty in precipitating as solids at the pH of the aging step.

As a result of carrying out the aging step, pentavalent vanadium oxide precipitates out of solution. Based on the results of X-ray diffraction measurement and X-ray fluorescence analysis (XRF), this compound is a vanadium oxide containing a cation (X) of the base used for leaching and is represented by the general formula $H_{n\delta}X_{(1-n)-\delta}V_3O_8 \cdot mH_2O$. Here, n represents the valence of the cation X, and represents the shift from the chemical equivalent. The amount of the cation X incorporated in the oxide is thought to vary according to the pH, temperature and retention time during aging. Furthermore, in the case of having carried out alkaline leaching with sodium hydroxide, X becomes Na in nearly all cases since sodium accounts for an overwhelmingly large proportion of cations present in the solution.

[Separation Step]

The separation step is for separating the leachate from a precipitate following the aging step. A known method can be used for the separation method, and separation can be carried out by filtration, for example. The separated precipitate is a vanadium compound. Differing from a filtration step targeted at the obtaining of a solution, the target substance of this separation step is the precipitate.

Examples of the resulting vanadium compounds include $NaV_3O_8 \cdot 1.5H_2O$, $H_{0.33}Na_{0.67}V_3O_8 \cdot 1.5H_2O$ and $H_{0.2}V_{0.8}V_3O_8 \cdot H_2O$ in the case of carrying out alkaline leaching with sodium hydroxide, or $KV_3O_8 \cdot 1.5H_2O$, $H_{0.3}K_{0.7}V_3O_8 \cdot 1.5H_2O$ or $H_{0.4}K_{0.6}V_3O_8 \cdot 2H_2O$ in the case of carrying out alkaline leaching with potassium hydroxide.

A filter cloth or filter paper similar to that used in the filtration step can be used for the filter cloth or filter paper used in the separation step.

As has been previously described, according to the method for producing a vanadium compound according to one aspect of the present invention, a vanadium compound can be efficiently obtained from incineration ash generated in a boiler and the like. In addition, iron and other impurities other than the alkaline metal contained in the resulting vanadium compound can be reduced.

(Method for Producing Vanadium Solution)

The method for producing a vanadium solution according to one aspect of the present invention has a dissolution step for dissolving the vanadium compound, obtained with the aforementioned production method, in sulfuric acid.

The concentration of the vanadium solution can be suitably adjusted corresponding to the application. For example, in the case of using as an electrolyte for a redox flow secondary battery, the vanadium concentration is adjusted to 1.6 mol/L to 1.9 mol/L, while the sulfate ion concentration is adjusted to 3 mol/L to 6 mol/L.

In addition, at least one of sulfurous acid gas and aqueous sulfurous acid solution may be added in the dissolution step. The simultaneous use of sulfurous acid gas and aqueous sulfurous acid solution with sulfuric acid makes it possible to reduce pentavalent vanadium to the tetravalent state without the formation of any extraneous byproducts. Since tetravalent vanadium easily dissolves in acid, a sulfuric acid solution of a vanadium salt can be prepared in a comparatively short period of time.

In addition, the vanadium solution is preferably filtered following the preparation of the vanadium solution in the dissolution step. Filtration makes it possible to remove any fine, insoluble contaminants present. A filter cloth and the like similar to that used in the previously described filtration step can be used for the filter cloth and the like used in the dissolution step.

As has been previously described, according to the method for producing a vanadium solution according to one aspect of the present invention, a vanadium solution can be easily obtained. In addition, the amounts of impurities or contaminating ions contained in the resulting electrolyte are low. Consequently, the vanadium solution can be preferably used in, for example, the electrolyte of a redox flow secondary battery. In other words, according to the method for producing a vanadium solution according to one aspect of the present invention, a vanadium solution can be inexpensively obtained from incineration ash generated in a boiler and the like.

EXAMPLES

The following provides a detailed explanation of the present invention based on examples thereof. Furthermore, the present invention is not limited to only these examples.

(Vanadium Compound Composition)

Example 1

500 g of fuel incineration ash generated from a thermal power plant and collected in an electrostatic precipitator (to be referred to as EP ash) and 2 L of an aqueous sodium hydroxide solution were prepared. The initial hydroxide ion concentration of the aqueous sodium hydroxide solution was 1 mol/L.

The prepared EP ash was added to the aqueous sodium hydroxide solution. The mixture was then stirred for 2 hours with a magnetic stirrer to prepare leachate slurry. The pH of the leachate was 14.

The stirred leachate slurry was filtered with a membrane filter having a pore size of 0.1 micrometers, a diaphragm pump, a suction bottle and a glass filter. 6 mol/L sulfuric acid was then dropped into the filtered leachate until the pH reached 2.23. As the sulfuric acid was dropped in, the solution changed from colorless to orange. In addition, since a white precipitate formed at pH 6.8 during the course of the pH lowering, the precipitate was filtered out with a filtration device.

After adjusting the pH, the leachate was held for 2 hours in a hot water bath at 80° C. After 2 hours had elapsed, a dark red precipitate formed. The resulting precipitate was filtered, washed and dried. Measurement of the mass of the substance after drying yielded a value of 8.2 g.

As a result of measuring by X-ray diffraction, the resulting precipitate was assigned to the $NaV_3O_8 \cdot 1.5H_2O$ phase. As a result of measuring by X-ray fluorescence, sodium was actually determined to be contained at an atomic ratio 0.2 times that of vanadium. The compositions of the contained elements and original EP ash are summarized in Table 1. Furthermore, the elemental amounts of Al and Si were measured by inductively coupled plasma (ICP) atomic emission spectrometry.

Example 2

Example 2 differs from Example 1 in that an oxidizing agent in the form of sodium hypochlorite having an effective chlorine concentration of 5% was added to the initial aqueous sodium hydroxide solution. The initial hydroxide ion concentration of the aqueous sodium hydroxide solution containing the sodium hypochlorite was 1 mol/L. Other conditions were the same as those of Example 1, and the measurement conditions and results are shown in Table 1.

Example 3

Example 3 differs from Example 1 in that filtration was not carried out at the stage the pH reached 6.8 in the pH adjustment step during which sulfuric acid was dropped in. Other conditions were the same as those of Example 1, and the measurement conditions and results are shown in Table 1.

Example 4

Example 4 differs from Example 1 in that the leachate following pH adjustment was allowed to stand for 3000 hours at normal temperature (20° C.). Other conditions were the same as those of Example 1, and the measurement conditions and results are shown in Table 1.

Example 5

Example 5 differs from Example 1 in that the leachate following pH adjustment was allowed to stand for 2 hours at 150° C. Other conditions were the same as those of Example 1, and the measurement conditions and results are shown in Table 1. Furthermore, Example 5 was carried out in a sealed container while applying pressure of 0.5 MPa to prevent evaporation of the leachate at 150° C.

Example 6

Example 6 differs from Example 1 in that, after allowing the leachate following pH adjustment to stand for 2 hours at 150° C., the leachate was cooled to 80° C. and then further allowed to stand for 40 hours at 80° C. Other conditions were the same as those of Example 1, and the measurement conditions and results are shown in Table 1.

Example 7

Example 7 differs from Example 2 in that furnace ash (clinker) was used instead of EP ash. Other conditions were the same as those of Example 1, and the measurement conditions and results are shown in Table 1. Furnace ash adheres to the inside of furnaces used at thermal power plants. Furnace ash differs from EP ash in that it does not contain unburned carbon and nearly all vanadium is in the form of tetravalent vanadium.

Comparative Example 1

500 g of fuel incineration ash (EP ash) generated from a thermal power plant in the same manner as Example 1 and 2 L of 0.5 mol/L sulfuric acid were prepared. The sulfuric acid was in the form of an acidic solution, and the initial hydroxide ion concentration of the sulfuric acid solution as calculated back from the hydrogen ion concentration was $10^{-14}$ mol/L.

The prepared EP ash was added to the 0.5 mol/L sulfuric acid solution. The mixture was then stirred for 2 hours with a magnetic stirrer to prepare a leachate. The pH of the leachate was 0.3. After stirring, the slurry was filtered with a membrane filter having a pore size of 0.1 micrometer, a diaphragm pump, a suction bottle and a glass filter. NaOH was then added to the filtered leachate to adjust the pH to 2.3.

After adjusting the pH, the leachate was held for 2 hours in a hot water bath at 80° C. After two days had elapsed, the formed precipitate was filtered, washed and dried. Measurement of the mass of the substance after drying yielded a value of 7.9 g. Measurement conditions and results are shown in Table 1.

Comparative Example 2

The leachate was filtered immediately without allowing to stand following pH adjustment (or in other words, the aging step was omitted). As a result, a solid precipitate was not collected following filtration. Measurement conditions and results are shown in Table 1.

TABLE 1

| | Example 1 Mass % | Example 2 Mass % | Example 3 Mass % | Example 4 Mass % | Example 5 Mass % | Example 6 Mass % | Example 7 Mass % | Comp. Ex. 1 Mass % | Comp. Ex. 2 Mass % |
|---|---|---|---|---|---|---|---|---|---|
| O | 46.2 | 46.1 | 45.9 | 46.2 | 46.0 | 46.1 | 45.9 | 47.5 | — |
| Na | 7.1 | 6.9 | 7.4 | 6.9 | 7.2 | 7.0 | 7.8 | 0.3 | — |
| Al | 0.0 | 0.0 | 0.1 | 0.0 | 0.0 | 0.0 | 0.0 | 0.2 | — |
| Si | 0.0 | 0.0 | 0.1 | 0.0 | 0.0 | 0.0 | 0.0 | 0.1 | — |
| V | 46.8 | 46.9 | 46.7 | 46.8 | 46.5 | 46.9 | 46.1 | 24.0 | — |
| Fe | 0.0 | 0.0 | 0.0 | 0.0 | 0.0 | 0.0 | 0.0 | 27.0 | — |
| Ni | 0.0 | 0.0 | 0.0 | 0.0 | 0.0 | 0.0 | 0.0 | 0.0 | — |
| Sample | EP ash | EP ash | EP ash | EP ash | EP ash | EP ash | Clinker | EP ash | EP ash |
| Solution | NaOH | NaOH | NaOH | NaOH | NaOH | NaOH | NaOH | $H_2SO_4$ | NaOH |
| Initial $OH^-$ Concentration (calculated) | 1 mol/L | 1 mol/L | 1 mol/L | 1 mol/L | 1 mol/L | 1 mol/L | 1 mol/L | $10^{-14}$ mol/L | 1 mol/L |
| Oxidizing Agent | — | NaClO | — | — | — | — | NaClO | — | — |
| Filtration in pH Adjustment Step | Yes | Yes | — | Yes | Yes | Yes | Yes | — | — |
| Aging Time | 48 h | 48 h | 48 h | 3000 h | 2 h | 150° C., 2 h → 80° C., 40 h | 48 h | 48 h | 0 h |
| Aging Temp. | 80° C. | 80° C. | 80° C. | 20° C. | 150° C. | | 80° C. | 80° C. | 80° C. |
| Recovered Amt. of Vanadium Compound | 8.2 g | 10.7 g | 8.2 g | 7.9 g | 1.1 g | 8.3 g | 35 g | 7.9 g | 0 g |

Furthermore, although there is one example in which the total for each element exceeds 100% by mass, this is due to rounding error.

When a comparison is made between Example 1 and Example 2, the amount of vanadium compound recovered in Example 2 was greater. This is thought to be because, as a result of adding an oxidizing agent, the majority of vanadium ions in the leachate had a valence of 5, thereby resulting in an increase in the amount of vanadium ions that leached from the EP ash.

In addition, Al and Si components were detected in the resulting vanadium compound in Example 3. This is thought to be due to alumina and the like being contained in the vanadium compound as a result of having precipitated when the pH became neutral. The amount of vanadium compound recovered was about the same as in Example 1.

Based on the results of Examples 4, 5 and 6, vanadium compounds were able to be confirmed to be obtained even if aging time and aging temperature are changed. In Example 4, the aging temperature was lower than that of Example 1, and the amount of vanadium compound recovered was lower than that of Example 1. In Example 5, although the aging temperature was higher than that of Example 1, the aging time was shorter than that of Example 1, and although the amount of vanadium compound recovered was less than that of Example 1, the vanadium compound was obtained despite the shorter aging time as a result of aging at a high temperature. In Example 6, as a result of allowing to stand at 80° C. in the same manner as Example 1 after having caused rapid precipitation at 150° C., the amount of vanadium compound obtained was slightly larger than that of Example 1.

Based on the results of Example 7, a vanadium compound was able to be confirmed to be similarly recovered even if furnace ash was used instead of EP ash. The amount of vanadium recovered was thought to have increased since the vanadium content of furnace ash is roughly six times greater than that of EP ash.

Although Fe was not detected in any of the examples (the content thereof in vanadium compounds is less than 0.1% by mass), a large amount of Fe impurities were detected in Comparative Example 1. This is thought to be due to the occurrence of a precipitation reaction involving the vanadium compound in the solution containing these impurities since the EP ash was added to an acidic solution.

In addition, a vanadium compound was not obtained in Comparative Example 2. Although conditions existed for the precipitation of a vanadium compound based on the phase diagram, the vanadium compound dissolved in the solution in a supersaturated state immediately following pH adjustment, thereby preventing the obtaining of a precipitate.

(Measurement of Leachate)

Next, components of the leachate following the addition of EP ash to the alkaline solution were examined by changing the concentration of the alkaline solution.

Reference Example 10

10 g of fuel incineration ash generated from a thermal power plant and 200 mL of aqueous sodium hydroxide solution were prepared. The initial hydroxide ion concentration of the aqueous sodium hydroxide solution was 1 mol/L.

The prepared EP ash was added to the aqueous sodium hydroxide solution. The mixture was then stirred for 2 hours with a magnetic stirrer to prepare leachate slurry. The supernatant of the resulting leachate slurry was collected, and the pH and components of the leachate were measured using a pH meter and ICP atomic emission spectrometry. The results are shown in Table 2. Components of the leachate of Example 10 correspond to the components of the leachate of Example 1.

Reference Examples 11 to 19

Reference Examples 11 to 19 differ from Reference Example 10 in that the initial hydroxide ion concentration of the aqueous sodium hydroxide solution was changed as shown in Table 2. The pH and components of the leachates were measured with the other conditions being the same as those of Reference Example 10. Furthermore, pH values above 14 approached the detection limit of the pH meter. Although these values contain some degree of error, the pH was not below 14.

TABLE 2

| | NaOH Solution | | | Leachate (Supernatant) | | | | | | | | Amt. of vanadium leached based on EP ash (mass %) |
|---|---|---|---|---|---|---|---|---|---|---|---|---|
| | OH⁻ concentration (mol/L) | Calculated pH | pH | Al (ppm by mass) | CA (ppm by mass) | Fe (ppm by mass) | Mg (ppm by mass) | Na (ppm by mass) | Ni (ppm by ass) | Si (ppm by mass) | V (ppm by mass) | |
| Ref. Ex. 10 | 1 | 14.0 | 13.9 | 16 | 2.4 | <1 | <1 | 24000 | <1 | 120 | 680 | 1.36 |
| Ref. Ex. 11 | 0.5 | 13.7 | 13.5 | 8.9 | 5.4 | <1 | <1 | 12000 | <1 | 92 | 630 | 1.26 |
| Ref. Ex. 12 | 0.25 | 13.4 | 13.3 | 2.2 | 13 | <1 | <1 | 6300 | <1 | 26 | 550 | 1.1 |
| Ref. Ex. 13 | 0.125 | 13.1 | 12.0 | 3.2 | 27 | <1 | <1 | 2900 | <1 | 40 | 550 | 1.1 |
| Ref. Ex. 14 | 0.0625 | 12.8 | 10.8 | <1 | 140 | <1 | 8.2 | 1500 | <1 | 9.9 | 540 | 1.08 |
| Ref. Ex. 15 | 0.03125 | 12.5 | 10 | <1 | 170 | <1 | 18 | 830 | <1 | 12 | 520 | 1.04 |
| Ref. Ex. 16 | 0.015625 | 12.2 | 8.6 | <1 | 210 | <1 | 26 | 400 | 40 | 15 | 300 | 0.6 |
| Ref. Ex. 17 | 0.0078125 | 11.9 | 5.5 | <1 | 220 | <1 | 28 | 260 | 81 | 8.8 | 160 | 0.32 |
| Ref. Ex. 18 | 16 | 15.2 | 14.8 | 40 | <1 | 5 | <1 | 0 | <1 | 170 | 700 | 1.4 |
| Ref. Ex. 19 | 5 | 14.7 | 14.5 | 24 | <1 | <1 | <1 | 0 | <1 | 150 | 690 | 1.38 |

According to Reference Examples 10 to 19, only slight amounts of Fe were detected in any of the examples. The amount of Fe was below the detection limit within an initial hydroxide concentration range of the aqueous sodium hydroxide solution of 0.007 mol/L to 5 mol/L, and Fe was not contained in the leachates.

In addition, in a comparison of Reference Examples 10 to 19, the detected amounts of Al, K and Si increased as the pH of the leachate became higher. However, the amounts contained in the resulting vanadium compound were only trace amounts as indicated in Example 3 (see Table 1). In addition, Al and Si can be removed by carrying out filtration at the point the pH becomes neutral in the pH adjustment step in which the liquid changes from an alkaline state to an acidic state.

In addition, the leached amounts of Ca, Mg and Ni increase if the pH of the leachate is low. Consequently, the pH of the leachate is preferably 10 or higher from the viewpoint of reducing impurities other than Fe contained in the resulting vanadium oxide.

(Use as Electrolyte for Redox Flow Secondary Battery)

Example 20

The vanadium compound obtained in Example 1 was dissolved in 4.5 M sulfuric acid. The entire amount of the vanadium compound dissolved in 2 weeks. The vanadium concentration of the solution following dissolution was 1.7 mol/L and the sulfate ion concentration was 4.4 mol/L. The sodium ion concentration was 0.25 mol/L. In addition, the conductivity of this solution at 23° C. was 24.0 S/m.

50 mL of the resulting solution were filled into the cathode chamber, 50 mL of 4.5 M sulfuric acid were filled into the anode chamber, and electrolysis was carried out at a constant current of 2 A using a redox flow battery. Graphite felt manufactured by Toyobo Co., Ltd. was used for the cathode, while a platinum electrode was used for the anode. The CMX cation exchange membrane manufactured by Astom Corp. was used for the ion exchange membrane. The geometric area of the electrodes was 25 cm², and the electrolyte circulating velocity was 28.8 ml/min. Electrolysis was carried out for 14,100 seconds followed by recovery of the solution.

A redox flow battery was assembled using this solution for the electrolyte after which a charge/discharge test was carried out on the resulting battery. Cell resistivity was 1.13 Ω·cm², discharge capacity was 0.93 Ah, and Coulomb efficiency was 97.0%. These values indicate properties that are in no way inferior to electrolyte prepared from reagent grade vanadyl sulfate and sulfuric acid.

Example 21

Sulfurous acid gas and aqueous sulfurous acid solution were added to sulfuric acid when the vanadium compound was dissolved in sulfuric acid. Other conditions were the same as those in Example 20.

As a result of adding sulfurous acid gas and aqueous sulfurous acid solution to the sulfuric acid, the amount of time required to dissolve the vanadium compound was shortened from 2 weeks to 10 minutes. When a redox flow secondary battery was operated using the resulting vanadium solution, results were obtained that were similar to those of Example 20.

The invention claimed is:

1. A method for producing a vanadium compound, comprising:
    an alkaline leaching step for immersing incineration ash in an alkaline solution to cause vanadium to leach from the incineration ash into the alkaline solution and obtain a leachate slurry,
    a solid-liquid separation step for separating the leachate slurry obtained in the alkaline leaching step into a solid and liquid followed by removing insoluble matter to obtain a leachate,
    a pH adjustment step for adding acid to the leachate following solid-liquid separation to make the leachate acidic,
    an aging step for aging the leachate following pH adjustment until a precipitate forms in the leachate, and
    a separation step for separating the precipitate from the leachate following the aging step.

2. The method for producing a vanadium compound according to claim 1, wherein the solid-liquid separation is carried out by filtration.

3. The method for producing a vanadium compound according to claim 1, wherein an oxidizing agent is added to the alkaline solution in the alkaline leaching step.

4. The method for producing a vanadium compound according to claim 1, wherein the pH of the alkaline solution following immersion of the incineration ash in the alkaline leaching step is 10 or higher.

5. The method for producing a vanadium compound according to claim 1, further comprising an impurity removal step for removing impurities from the leachate when the pH of the leachate has been made higher than 6 but lower than 8 by addition of acid in the pH adjustment step.

6. The method for producing a vanadium compound according to claim 1, wherein the temperature in the aging step is 20° C. to 200° C.

7. The method for producing a vanadium compound according to claim 1, wherein the duration of aging of the leachate in the aging step is 2 hours to 3000 hours.

8. The method for producing a vanadium compound according to claim 1, wherein the vanadium compound produced includes at least one compound selected from the group consisting of $NaV_3O_8 \cdot 1.5H_2O$, $H_{0.33}Na_{0.67}V_3O_8 \cdot 1.5H_2O$, $H_{0.2}V_3O_8 \cdot H_2O$, $KV_3O_8 \cdot 1.5H_2O$, $H_{0.3}K_{0.7}V_3O_8 \cdot 1.5H_2O$ and $H_{0.4}K_{0.6}V_3O_8 \cdot 2H_2O$.

9. The method for producing a vanadium compound according to claim 1, wherein the amount of Fe contained in the vanadium compound produced is less than 0.1% by mass.

10. The method for producing a vanadium compound according to claim 1, wherein the material that composes the alkaline solution is sodium hydroxide, sodium carbonate or potassium hydroxide.

11. The method for producing a vanadium compound according to claim 1, wherein the incineration ash is fly ash.

12. The method for producing a vanadium compound according to claim 1, wherein the incineration ash is furnace ash.

13. A method for producing a vanadium solution, comprising: a dissolution step for dissolving a vanadium compound, obtained according to the method for producing a vanadium compound according to claim 1, in sulfuric acid.

14. The method for producing a vanadium solution according to claim 13, wherein sulfurous acid gas and aqueous sulfurous acid solution are added to the sulfuric acid in the dissolution step.

15. A method for producing a redox flow battery electrolyte using a vanadium compound produced according to the method for producing a vanadium compound according to claim 1, wherein the electrolyte contains at least one of trivalent and tetravalent vanadium ions.

16. The method for producing a redox flow battery electrolyte according to claim 15, wherein the iron concentration in the electrolyte is 100 ppm by mass or less and the nickel concentration is 200 ppm by mass or less.

17. The method for producing a vanadium compound according to claim 1, wherein the alkaline solution iron concentration in the electrolyte is 100 ppm by mass or less and the nickel concentration is 200 ppm by mass or less.

* * * * *